United States Patent [19]

Sugiyama et al.

[11] Patent Number: 5,068,917
[45] Date of Patent: Nov. 26, 1991

[54] PORTABLE RADIO TRANSCEIVER

[75] Inventors: Shouji Sugiyama; Daisuke Ohtani; Tadao Tajima, all of Yokohama, Japan

[73] Assignee: Matsushita Electric Industrial Co., Ltd., Osaka, Japan

[21] Appl. No.: 414,298

[22] Filed: Sep. 29, 1989

[51] Int. Cl.⁵ .............................................. H04B 1/08
[52] U.S. Cl. ..................................... 455/90; 455/347
[58] Field of Search .................. 455/347, 90, 348, 89, 455/349, 128, 350, 95, 351, 127, 343; 361/399, 395, 422

[56]  References Cited
U.S. PATENT DOCUMENTS

| | | | |
|---|---|---|---|
| 4,233,686 | 11/1980 | Sato | 455/348 |
| 4,653,115 | 3/1987 | Holcomb | 455/127 |
| 4,803,473 | 2/1989 | Taylor | 455/90 |
| 4,879,751 | 11/1989 | Matsumoto | 455/348 |

FOREIGN PATENT DOCUMENTS 1135128  5/1989  Japan .

*Primary Examiner*—Curtis Kuntz
*Attorney, Agent, or Firm*—Stevens, Davis, Miller & Mosher

[57] ABSTRACT

A portable radio transceiver comprising a chassis having end sides, a manipulating section and an electronic circuit carried by the chassis, an attaching plate pivotally attached on one of the end sides of the chassis, a speaker attached on the attaching plate, and a housing having side walls and an aperture formed in one of the side walls, whereby the attaching plate is swung toward the aperture means when the chassis is bottomed in the housing so as to hold the speaker in contact with the aperture.

6 Claims, 4 Drawing Sheets

PORTABLE RADIO TRANSCEIVER

BACKGROUND OF THE INVENTION

The present invention relates to a portable radio transceiver, and more particularly, to a portable radio transceiver having a construction that in which a chassis carrying a manipulating section, an electronic circuit and a speaker are inserted in a housing.

PRIOR ART

A conventional portable radio transceiver will be described below in conjunction with a sectional view of FIG. 4. Referring to this figure, the portable radio transceiver is constituted by a manipulating section 1 to which a manipulating function unit is attached, a chassis 4 connected to said manipulating section 1 while incorporating an electronic circuit 2 and having a speaker 3 attached thereto, and a housing 5 fixed to said manipulating section 1 while accommodating said chassis 4 and having a plurality of sound holes 5a formed in an upper surface thereof at its right-hand end. It is designed that when the chassis 4 is received in the housing 5 and then fixed thereto by means of a screw 6 provided in a right end surface of housing 5, a gap is defined between a top surface of the chassis 4 and an inside surface of the housing 5 as indicated by an arrow a.

In the above construction, however, the presence of the gap a contributes to easy assembly but gives rise to a problem that sound pressure is reduced when the sound is transmitted from the speaker to the outside. This is because the sound is dispersed within the housing 5 and, at the same time, no baffle effect is obtained because the speaker 3 is not made to come closely in contact with the inner wall of the housing 5. In addition, there gives rise to another problem that the above construction is unsuitable for the drip-proof structure.

SUMMARY OF THE INVENTION

The present invention is directed to solving the above-described problems, and an object thereof is to provide a portable radio transceiver which is capable of exhibiting satisfactory sound pressure, high tone quality and excellent drip-proof property.

To this end, according to the present invention, there is provided a portable transceiver comprising a chassis having side surfaces, a manipulating section and an electronic circuit carried by the chassis, an attaching plate pivotally attached to one of the side surfaces of the chassis, a speaker attached on the attaching plate, and a housing having side walls and an aperture formed in one of the side walls, whereby the attaching plate is swung toward the aperture means when the chassis is bottomed in the housing so as to hold the speaker in contact with the aperture.

According to the above construction, the chassis to which the manipulating section is connected can be readily inserted into the housing since the attaching plate for the speaker is kept flat at the time of insertion of the chassis. When the chassis is fixed by means of a screw provided at the bottom of the housing, an obtuse-angled bent portion of the attaching plate is deformed into a substantially right-angled shape so as to generate a repulsion which acts to deform a ring-shaped packing fitted around the speaker so as to make the same come in close contact with the inside surface of the housing.

In consequence, the sound from the speaker is prevented from being dispersed within the housing and, at the same time, the housing can be utilized as a baffle board, thereby increasing the external sound pressure and improving the tone quality.

BRIEF DESCRIPTION OF THE DRAWING

The features and advantages of the present invention will be apparent from the following description in which an embodiment of the present invention will be detailed in conjunction with the accompanying drawings in which.

DESCRIPTION OF THE PREFERRED EMBODIMENT

Figure 1:
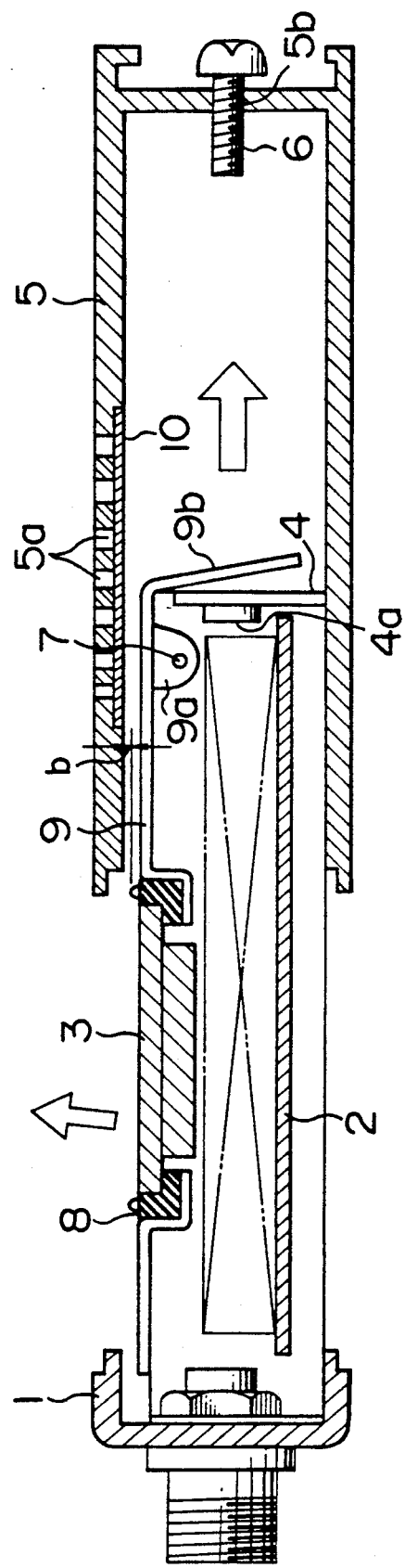
FIG. 1 is a sectional view of a portable radio transceiver according to the present invention, showing essential parts thereof in mid course of receiving operation.

A preferred embodiment of the present invention will be described below with reference to FIG. 1 to 3. In FIG. 1, a manipulating section 1 to which a manipulating function unit is attached is connected to a chassis 4 which incorporates an electronic circuit 2.

A support shaft 7 is planted on the chassis 4. An attaching plate 9 on which a speaker 3 is attached through a ring-shaped packing 8 made of an elastic material is pivotally mounted on the support shaft 7. The attaching plate material 9 is made of an elastic plate, and is formed with an obtuse-angled bent end part 9b at a portion thereof in the vicinity of a bearing 9a born on the support shaft 7.

The chassis 4 has a projection formed by means of burring at its right-hand end, and a screw hole 4a is formed in this projection. A screw hole 5b in which a screw 6 is fitted is formed in a right-hand bottom of the housing 5 so as to be aligned with the screw hole 4a.

Incidentally, an annular rib 8a (see FIG. 2) is formed on an upper surface of the ring-shaped packing 8.

Referring first to FIG. 1, when it is intended that the chassis 4 to which the manipulating section 1 is connected is received in the housing 5, since there is defined a gap between the annular rib 8a formed on the upper surface of the ring-shaped packing 8 and the inner wall of the housing 5 as indicated by a dimension line b, the chassis 4 can be readily inserted.

Further insertion causes first the forward end of the bent end part 9b of the attaching plate 9 to come in contact with the bottom of the housing 5. Subsequently, as the screw 6 fitted in the screw hole 4a of the chassis 4 is tightened, the bent end part 9b is elastically deformed from the obtuse-angled shape into a substantially right-angled shape so as to generate a repulsion which acts to press the annular rib 8a of the ring-shaped packing 8 surrounding the speaker 3 against the inner wall surface of the housing 5 while deforming the same, thereby assuring close contact between them.

A reference numeral 10 denotes a dust- and drip-proof sheet which is adhered to the back side of the sound holes 5a and which serves to avoid dust and drip.

Figure 2:
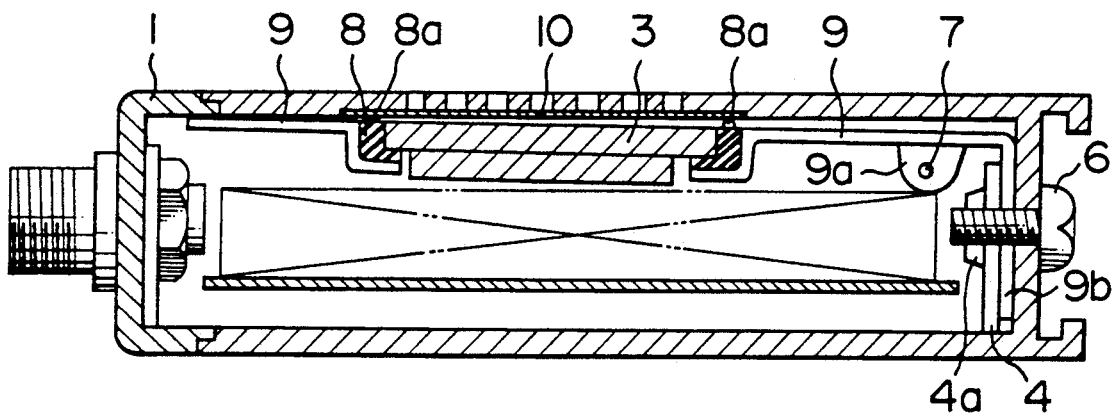
FIG. 2 is a sectional view showing essential parts of the transceiver after completion of the receiving operation.

FIG. 2 shows a state where tightening of the screw 6 has been completed.

Figure 3:
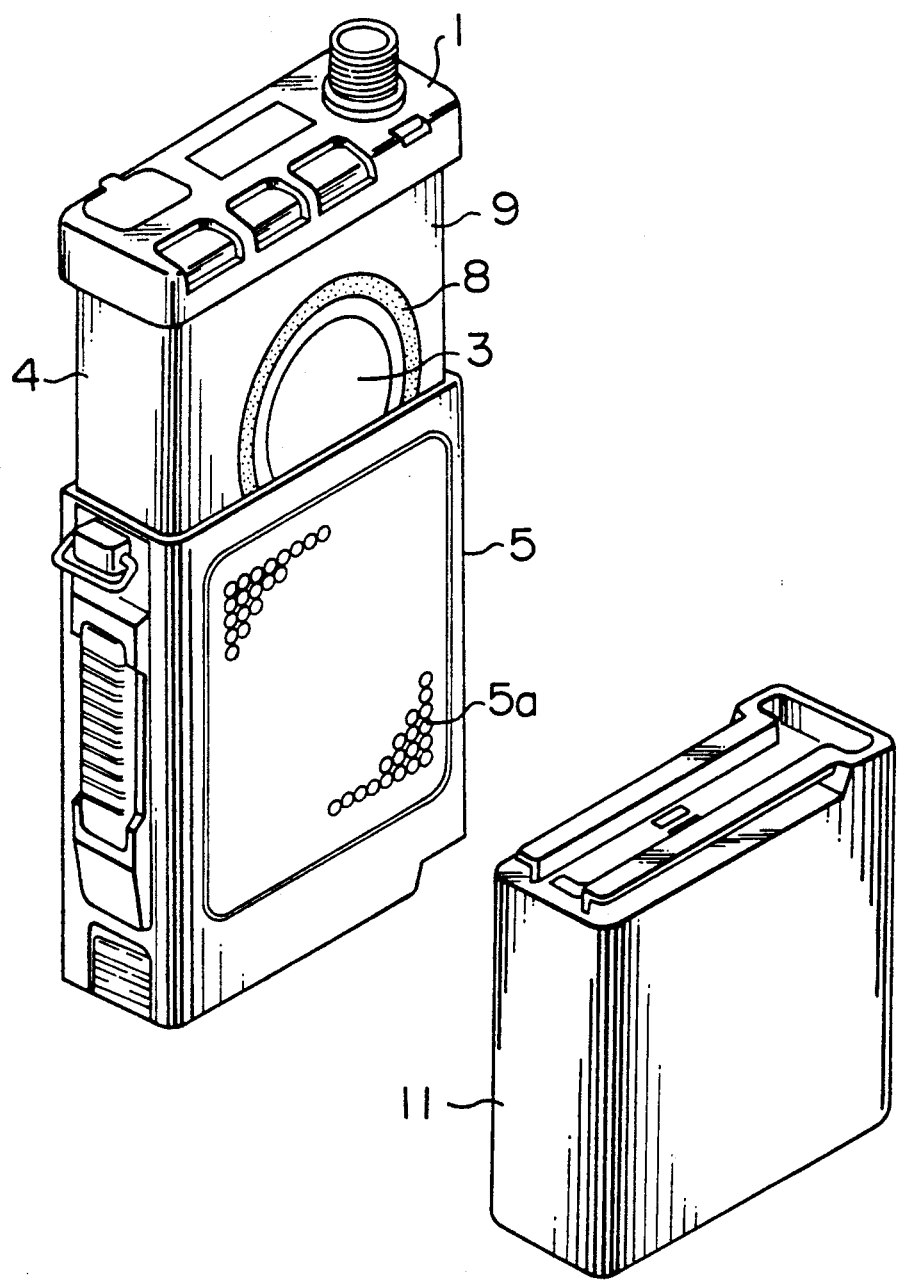
FIG. 3 is a perspective view corresponding to FIG. 1.
Figure 4:
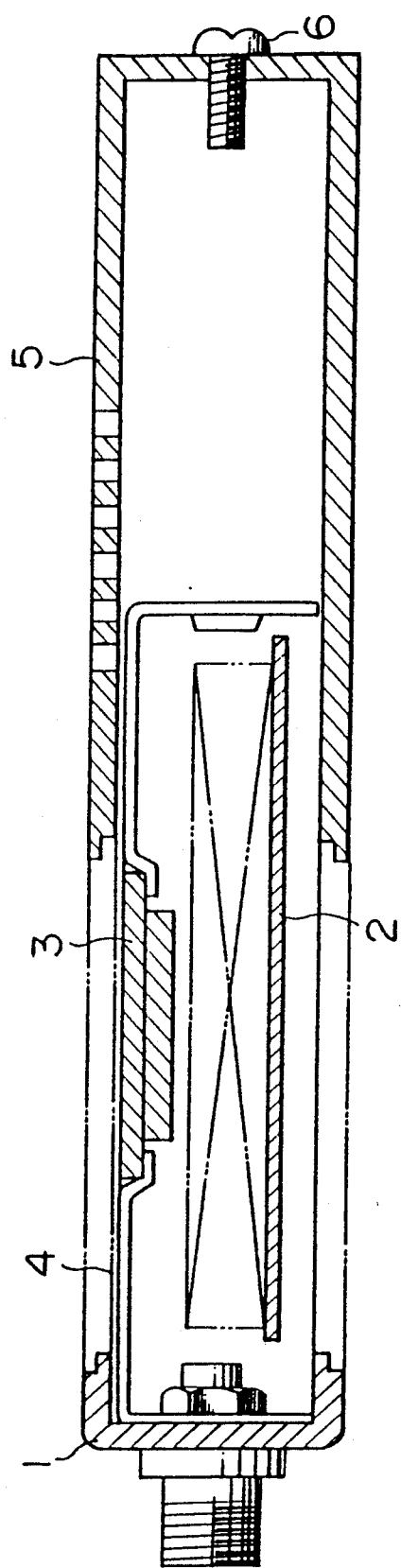
FIG. 4 is a sectional view of a conventional portable radio transceiver, showing essential parts thereof in mid course of receiving operation.

FIG. 3 is a perspective view of the portable radio transceiver in the same state as shown in FIG. 1. In addition to the component parts shown in FIG. 1, there is shown a removable battery case 11 adapted to be attached to the bottom of the housing 5.

As has been described in the foregoing, according to the present invention, since the ringshaped packing surrounding the speaker is effectively made to come in close contact with the inner wall of the housing, it is possible to obtain a portable radio transceiver which exhibits satisfactory sound pressure, a high tone quality and excellent drip-proof property.

What is claimed is:

1. A portable transceiver comprising:
 a chassis having end sides;
 a manipulating section on an electronic circuit carried by said chassis;
 an attaching plate pivotally attached on one of said end sides of said chassis;
 a speaker attached on said attaching plate;
 a housing having side walls and an aperture means formed in a first one of said side walls; and
 means for swinging said attaching plate and holding said attaching plate against said aperture means when said chassis is bottomed in said housing, wherein said attaching plate has a bent end part substantially perpendicular to said attaching plate which abuts against a second one of said side walls of said housing when said chassis is bottomed in said housing, said bent end part has a screw hole formed therein, and said housing has a screw hole formed in said second one of said side walls associated with said bent end part, said screw hole formed in said bent end part and said screw hole formed in said second one of said side walls associated with said bent end part being aligned with each other when said chassis is bottomed in said housing, and a securing screw is fitted in both said screw hole formed in said bent end part and said screw hole formed in said second one of said side walls associated with said bent end part so as to fasten together said bent end part and said second one of said side walls associated with said bent end part.

2. A portable transceiver comprising:
 a chassis having an end side;
 a manipulating section on an electronic circuit carried by said chassis;
 an attaching plate pivotally attached on said end side of said chassis;
 a speaker attached on said attaching plate;
 a seal member attached to said attaching plate;
 a housing having side walls and an aperture means formed in a first one of said side walls; and
 means for swinging said attaching plate so as to press said seal member against said aperture means when said chassis is bottomed in said housing.

3. A transceiver as set forth in claim 2, wherein said attaching plate has a bent end part substantially perpendicular to said attaching plate which abuts against a second one of said side walls of said housing when said chassis is bottomed in said housing.

4. A transceiver as set forth in claim 1, a bead section is formed around said speaker, said bead section being in press-contact with said aperture means.

5. A transceiver as set forth in claim 1, wherein said aperture means comprises perforations formed in said first one of said side walls of said housing.

6. A portable transceiver, comprising:
 a chassis having one end side;
 a manipulating section on an electronic circuit carried by said chassis;
 an attaching plate pivotally attached on said end side of said chassis by a pivot means;
 a speaker attached on said attaching plate;
 a seal member attached on said attaching plate;
 a housing having side walls and an aperture mans formed in a first one of said side walls;
 a plate member integrally incorporated with said attaching plate and extending on one side of said pivot means remote from said chassis, at substantially a right angle to said attaching plate;
 a first screw hole formed in said plate member;
 a second screw hole formed in said second one of said side walls associated with said plate member, said first screw hole and said second screw hole being aligned with each other when said chassis is bottomed in said housing; and
 a securing screw adapted to be fitted in said first and second holes so as to fasten together said plate member and said second one of said side walls while pressing said seal member against said aperture means.

* * * * *